United States Patent
Hamlin et al.

(10) Patent No.: US 12,333,465 B2
(45) Date of Patent: Jun. 17, 2025

(54) DETECTION, AGGREGATION, AND DISTRIBUTION OF USER AND/OR TEAM EFFECTIVENESS UTILIZING FATIGUE DETECTION FROM ONLINE COLLABORATION

(71) Applicant: Dell Products, L.P., Round Rock, TX (US)

(72) Inventors: Daniel L. Hamlin, Round Rock, TX (US); Juan C. Agudelo, Round Rock, TX (US)

(73) Assignee: Dell Products, LLP, Round Rock, TX (US)

( * ) Notice: Subject to any disclaimer, the term of this patent is extended or adjusted under 35 U.S.C. 154(b) by 12 days.

(21) Appl. No.: 17/659,906

(22) Filed: Apr. 20, 2022

(65) Prior Publication Data

US 2023/0342682 A1    Oct. 26, 2023

(51) Int. Cl.
G06Q 10/0631    (2023.01)
G06Q 10/0639    (2023.01)

(52) U.S. Cl.
CPC ............... *G06Q 10/063114* (2013.01); *G06Q 10/063118* (2013.01); *G06Q 10/06398* (2013.01)

(58) Field of Classification Search
CPC ............. G06Q 10/063; G06Q 10/0639; G06Q 10/06398; G06Q 10/0631; G06Q 10/06311; G06Q 10/063114; G06Q 10/063118
See application file for complete search history.

(56) References Cited

U.S. PATENT DOCUMENTS

| | | | |
|---|---|---|---|
| 2005/0154634 A1* | 7/2005 | Konop | G06Q 10/06 705/7.27 |
| 2017/0004696 A1* | 1/2017 | Bastide | H04L 67/535 |
| 2018/0032944 A1* | 2/2018 | Sarvana | G06Q 10/1097 |
| 2018/0121766 A1* | 5/2018 | McCord | G06Q 10/06311 |
| 2018/0274927 A1* | 9/2018 | Epperlein | G01C 21/3415 |
| 2018/0365384 A1* | 12/2018 | Althoff | A61B 5/4815 |

(Continued)

OTHER PUBLICATIONS

Döring, N., De Moor, K., Fiedler, M., Schoenenberg, K., & Raake, A. (2002). Videoconference fatigue: A conceptual analysis. International Journal of Enviromental Research and Public Health, 19(4), 2061. (Year: 2022).*

(Continued)

*Primary Examiner* — William S Brockington, III
(74) *Attorney, Agent, or Firm* — Fogarty LLP

(57) ABSTRACT

Detection, aggregation, and distribution of user and team effectiveness includes detecting, using one or more machine learning algorithms, user fatigue levels, based, at least in part, on detected attributes and evaluating and/or classifying, using one or more machine learning algorithms, user fatigue levels, based, at least in part, on detected attributes. Detection, aggregation, and distribution of user and team effectiveness further includes creating, using a plurality of artificial intelligence algorithms, a plurality of inference models, based at least in part on detected and evaluated and/or classified user fatigue levels, predicting, by a machine learning predictive services algorithm, using the plurality of created inference models, user effectiveness at different intervals, and providing, by the machine learning predictive services algorithm, effectiveness weights for requested collaboration sessions that include the user.

17 Claims, 4 Drawing Sheets

(56) References Cited

U.S. PATENT DOCUMENTS

| | | | |
|---|---|---|---|
| 2021/0016182 A1* | 1/2021 | Barcias | A63F 13/21 |
| 2021/0093915 A1* | 4/2021 | Knight | A61B 5/486 |
| 2022/0115128 A1* | 4/2022 | Dusch | G16H 50/20 |
| 2022/0318705 A1* | 10/2022 | Reaume | G01M 99/005 |
| 2023/0133750 A1* | 5/2023 | Shayne | H04N 7/147 |
| | | | 348/14.09 |

OTHER PUBLICATIONS

Liz Fosslien, et al., "How to Combat Zoom Fatigue," Meetings, Apr. 29, 2020, 6 pages, Harvard Business Publishing.

\* cited by examiner

DETECTION, AGGREGATION, AND DISTRIBUTION OF USER AND/OR TEAM EFFECTIVENESS UTILIZING FATIGUE DETECTION FROM ONLINE COLLABORATION

FIELD

This disclosure relates generally to Information Handling Systems (IHSs) and their use, and more specifically, detection, aggregation, and distribution of user and/or team effectiveness utilizing fatigue detection from online collaboration.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs, such personal computers, laptops, tablets, smartphones, etc., are increasingly utilized for video conferences, which can prove draining on the user, resulting in video conference fatigue. Video conferences force the user to focus more intently on conversations in order to absorb information, compared to in-person conferences, or the like. Further, use of an IHS for video conferences enables a loss of focus, such as by enabling other IHS-related activities during a video conference, such as checking email, texting, reviewing social media, web browsing, etc., thus distracting from focus on the video conference. Additionally, many video conferences are conducted from a work-from-home situation, or the like. Hence, the number of video conferences may be greater, and the distractions may extend beyond the IHS-based distractions mentioned. Moreover, video conference fatigue may stem from how individuals process information presented over video. During a video conference a user tends to show they are paying attention by looking at the camera, rather than casually looking at one or more individuals while otherwise glancing about, in a manner typical during face-to-face meetings. Engage in such a "constant gaze" may make an individual uncomfortable, and fatigue them. Without visual breaks a user needs to refocus, the user's brain grows fatigued. Such video conference fatigue may result in lower productivity. Over time, video conference fatigue may result in undesirable physical and psychological consequences to users of IHSs.

SUMMARY

Embodiments of detection, aggregation, and distribution of user and/or team effectiveness utilizing fatigue detection from online collaboration are described. In an illustrative, non-limiting example, (a) machine learning algorithm(s), or the like, is (are) used to detect user fatigue levels, based, at least in part, on detected attributes and to evaluate user fatigue levels, based, at least in part, on detected attributes. The detected attributes may include information handling system use telemetry, real time use of an information handling system, calendaring application program data, collaborative services reporting data, for the user, and/or the like. A plurality of artificial intelligence algorithms, or the like, are used to create a plurality of inference models, based at least in part on detected and evaluated and/or classified user fatigue levels. The plurality of artificial intelligence algorithms may include a face service, a cognitive service, and/or the like. A machine learning predictive services algorithm, or the like, predicts, by using the plurality of created inference models, user effectiveness at different intervals. The machine learning predictive services algorithm, or the like, provide effectiveness weights for requested collaboration sessions that include the user.

The machine learning algorithms may include a face recognition application program interface, a text analytics application program interface, a language understanding service, and/or the like. For example, a face recognition application program interface may provide detected and evaluated and/or classified user fatigue levels to an artificial intelligence face service, and/or a text analytics application program interface and/or language understanding service may provide detected and evaluated and/or classified user fatigue levels to an artificial intelligence cognitive service. As further examples thereto, the artificial intelligence face service may create an emotion inference model, based at least in part on detected and evaluated and/or classified user fatigue levels, and the artificial intelligence cognitive service may create a sentiment inference model, based at least in part on detected and evaluated and/or classified user fatigue levels.

Detecting user fatigue levels may include detecting visual fatigue in the user, and predicting user effectiveness at different intervals may include predicting visual fatigue in the user. Additionally, or alternatively, detecting user fatigue levels may include detecting emotional fatigue in the user, and predicting user effectiveness at different intervals may include predicting emotional fatigue in the user.

Providing effectiveness weights for requested collaboration sessions that include the user may include providing a recommendation value during collaboration configuring. The recommendation value may be a heat map dial indicating the effectiveness weights, a red, yellow, green indicator corresponding to the effectiveness weights, or the like. This collaboration configuring may be carried out on a calendaring application program and the recommendation value may be provided to the calendaring application program and presented by the calendaring application program as an indication of the recommendation value for a collaboration session.

A bot, and/or the like, may suggest an optimum time for the requested collaboration session, based, at least in part, on the effectiveness weights, recommendation values, and/or the like, associated with different times. Thereby, where collaboration configuring is carried out on a calendaring application program, the calendaring application program may present an option, to a collaboration organizer, for the bot to determine the optimum time for the requested collaboration session.

A logic application program, and/or the like, may monitor for changes in the recommendation value, effectiveness weights, and/or the like, for requested collaboration sessions, following scheduling of a collaboration session, and report a change in the recommendation value, effectiveness weights, and/or the like, for the collaboration session to a collaboration session organizer.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
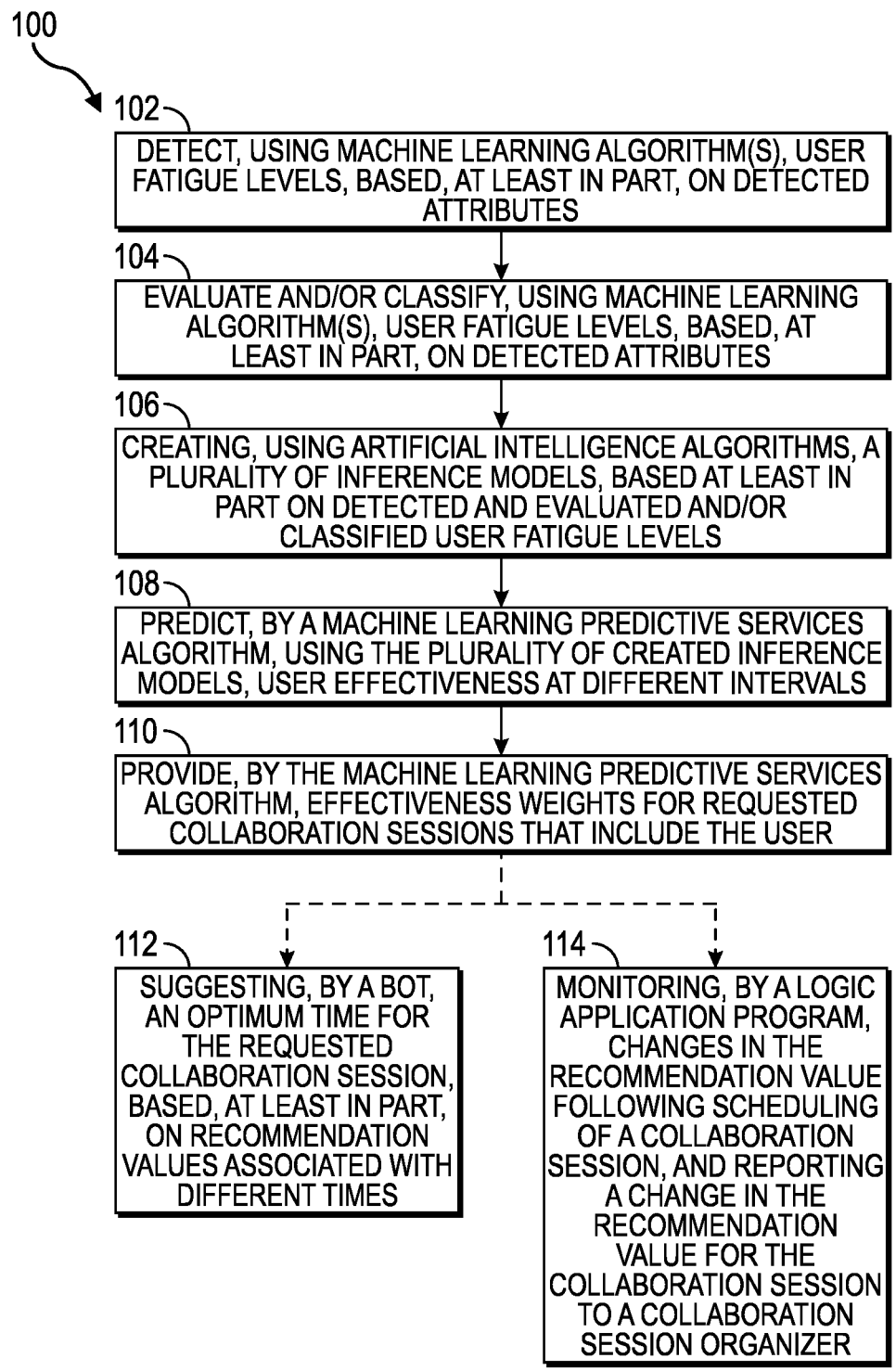
FIG. 1 is a flowchart of an example process to detect, aggregate, and distribute user and team effectiveness, according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. Example IHSs are described in more detail below.

Detecting and responding, in accordance with embodiments of the present systems and methods when an individual or team has video conference fatigue is multi-faceted. Currently, users are asked to complete surveys or detect they have video conference fatigue, after the fact. As noted, video conference fatigue affects an individual's health and the productivity of individuals or teams. As also noted, close-up of eye contact is highly intense and fatiguing, constant video chats in real-time are fatiguing, video chats dramatically reduce an individual's normal mobility. As discussed above, performance of users who experience video conference fatigue has been studied to be significantly impacted, and interaction with imaged users can provide an overall decrease of performance value to the broader audience or the user's team(s). Such characteristics and use cases highlight a concern for an inability to, heretofore, identify and predict user and team fatigue levels to deliver optimized recommendations for collaborative interactions.

Embodiments of the present systems and methods for detection, aggregation, and distribution of user and/or team effectiveness utilizing fatigue detection from online collaboration collect user performance data and provide predictive user and team performance indicators based on participant historical data and user meeting factors, including meeting performance, meeting frequency, meeting duration, and/or the like. To such ends, embodiments of the present systems and methods employ a combination of software services to detect and evaluate user fatigue levels based on detected attributes, create inference models to assist in predicting user effectiveness (i.e., performance) at different intervals, and provide effectiveness weights to requested collaboration sessions for wide team optimizations. As a result, embodiments of the present systems and methods detect and predict visual fatigue in an individual or a team, detect and predict emotional fatigue in an individual or team, and provide (a) recommendation value(s) during collaboration configuring, by providing, by a way of example, a scheduling calendar dial, RYG (red yellow green) past performance information indicator, etc., as discussed in greater detail below. Typically, scheduling, for example a meeting, is only dependent on the time and availability of other team members. A scheduling system does not typically have any other data point(s) to assist in scheduling meetings. Embodiments of the present systems and methods add more intelligence for scheduling, or otherwise arranging team meetings, including video conferences, or the like. For example, embodiments of the present systems and methods my employ a team predictive scheduling (program) calendar dial. In accordance with such embodiments users may be automatically classified based on the scheduled day and/or time of a meeting, the user's calendar population (e.g., meeting density) and/or the like. A heat map, or the like of the user's predictive "effectiveness" during a selected meeting time may be automatically created using this information. Additionally, classification of the type of meeting based on output needs (e.g., informative vs. productive, and/or the like) may be taken into account, in accordance with various embodiments of the present systems and methods. Additionally, under various embodiments, a user may perform a self-managed "identity," versus an aggregation and/or recommendation derived in accordance with embodiments of the present systems and methods review or analysis.

In a use case example, a user may often be fatigued the day following late-night overseas (video) calls. As a result, the user's productivity level may decrease, but their collaboration level may be increased due to meeting goals of discussion and interaction, compared to production and creation. The user's metadata is, in accordance with embodiments of the present systems and methods, identified via runtime modeling of IHS and user telemetry items from the IHS and associated sensors (camera, microphone, etc.), and a time-based heat map considering their productivity level and collaboration level is provided, also in accordance with embodiments of the present systems and methods.

Embodiments of the present systems and methods may employ machine learning services for analyzing faces, text analysis and for developing and managing bots (i.e., computer programs that perform automatic repetitive tasks). For example, embodiments of the present systems and methods may utilize a machine learning bot development service. The channels employed by various embodiments of the present systems and methods may be a machine learning web app, or the like, a meeting scheduling application, or the like, and a (video) conferencing application, or the like, implemented as a bot though use of a language understanding service, a bot builder, cognitive services based on service endpoints, a computer vision service with face detection and analysis to detect a user's mood, natural language processing, sentiment analysis, and/or the like, in combination with your a machine learning classification model workflow.

As noted, embodiments of the present systems and methods utilize machine learning predictive services. For example, in accordance with embodiments of the present systems and methods, a classification model based on predictive service may utilize cognitive service and face service (model) data. This classification model may utilize multiple machine learning algorithms that detect and classify a user's emotional and physical characteristics to provide a scaled collaborative meeting exhaustion and fatigue indication or indicator. Furthermore, the classification model may track the user's calendar data, determine predictive fatigue and emotional well-being, and influence the user to change their behavior.

As noted, in various embodiments, aspects of systems and methods described herein may be implemented, at least in part, using machine learning (ML). As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, artificial intelligence (AI), deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN.

FIG. 1 is a flowchart of example process 100 for detecting, aggregating, and distributing user and team effectiveness, according to some embodiments. Therein, at 102, one or more machine learning algorithms, or the like detects user fatigue levels, based, at least in part, on detected attributes. These detected attributes may include IHS use telemetry, real time use of an IHS, calendaring application program data (e.g., meeting density), collaborative (video) meeting services reporting data, and/or the like, for the user. In various embodiments, the detection of user fatigue levels at 102 may detect visual fatigue in the user, emotional fatigue in the user, team, and/or the like.

At 104, one or more (other) machine learning algorithms, or the like, may be used to evaluate and/or classify user fatigue levels, based, at least in part, on the detected attributes. The machine learning algorithms may include a face recognition application program interface, a text analytics application program interface, a language understanding service, and/or the like.

At 106, a plurality of artificial intelligence algorithms, or the like, create a plurality of inference models, based at least in part on detected, evaluated and/or classified user fatigue levels. These artificial intelligence algorithms may include a face service, a cognitive service, and/or the like. In accordance with various embodiments of the present systems and methods, the face recognition application program interface, or the like, may provide detected, evaluated and/or classified user fatigue levels to the artificial intelligence face service, or the like. Also, in accordance with various embodiments of the present systems and methods, the text analytics application program interface, language understanding service, and/or the like, may provide detected, evaluated and/or classified user fatigue levels to the artificial intelligence cognitive service, and/or the like. In such various embodiments, the artificial intelligence face service, or the like may create an emotion inference model, based at least in part on detected, evaluated and/or classified user fatigue levels, and the artificial intelligence cognitive service, or the like, may create a sentiment inference model, based at least in part on detected and evaluated and/or classified user fatigue levels.

At 108, a machine learning predictive services algorithm, uses the plurality of created inference models to predict user effectiveness (i.e., performance) at different intervals. In various embodiments, where the detection of user fatigue levels at 102 may detect visual fatigue, the prediction of user effectiveness at different intervals at 108 may include predicting visual fatigue in the user and/or team. Also, in various embodiments where detecting user fatigue levels includes detecting emotional fatigue in the user and/or team at 102, predicting user effectiveness at different intervals at 108 may further include predicting emotional fatigue in the user and/or team.

At 110, the machine learning predictive services algorithm provides effectiveness weights for requested collaboration sessions that include the user, for wide team optimizations. For example, in various embodiments the effectiveness weights may be provided as a recommendation value during collaboration configuring, such as when an organizer is setting up a (video) meeting, or the like. Effectiveness weights of each user (to be) invited as a meeting participant may be added and aggregated together to give an overall meeting rating, or the like. The collaboration configuring may be carried out, such as by a meeting organizer, using a calendaring application program, and the recommendation value may be provided to the calendaring application program and presented by the calendaring application program as an indication of the recommendation value for the collaboration session being organized, or, as discussed below for a meeting that has been organized and is pending. The recommendation value presented to the meeting organizer may take the form of a heat map dial indicating the effectiveness weights, in some embodiments, and in different, or the same embodiments, the recommendation value may take the form of a RYG indicator corresponding to the effectiveness weights.

Additionally, in some embodiments of the present systems and methods, a bot, or the like, may, at 112, suggest an optimum time for the requested collaboration session, based, at least in part, on recommendation values associated with different times. To such ends a calendaring application program being used to organize the collaboration may present an option, to the collaboration organizer, for the bot to determine the optimum time for the requested collaboration session.

Further, in some embodiments of the present systems and methods, multiple workflows into a logic application program, or the like, may, at 114, monitor for changes in the recommendation value, for collaboration sessions, following scheduling of the collaboration session, and report any (significant) change in the recommendation value for the collaboration session to a collaboration session organizer, collaboration session participants, or the like. The organizer may, in accordance with some embodiments of the present systems and methods, set a threshold for the meeting, which may result in such a notice.

Figure 2:
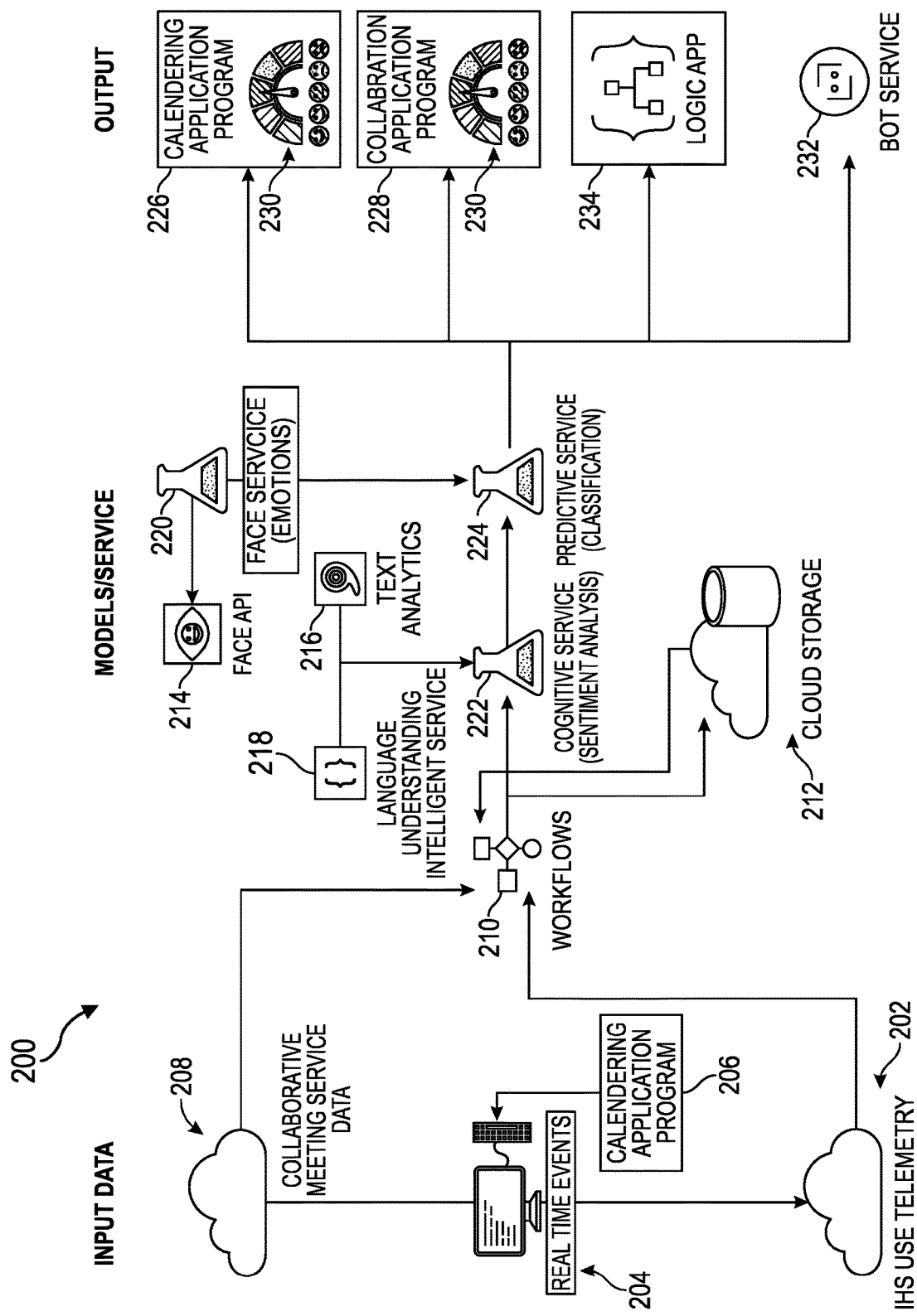
FIG. 2 is a block diagram of an example implementation of an embodiment of the present systems and methods to detect, aggregate, and distribute user and team effectiveness.

FIG. 2 is a block diagram of example implementation 200 of an embodiment of the present systems and methods to detect, aggregate, and distribute user and team effectiveness. Detected attributes used in accordance with embodiments of the present systems and methods (i.e., collected input data), may include IHS use telemetry 202, real time use of IHS 204, data (e.g., meeting density) from calendaring application program 206, collaborative (video) meeting services reporting data 208 collected by a collaborative (video) meeting services vendor, and/or the like, such as for the user of IHS 204. Telemetry 202, for example, may include information such as log in and out times, keyboard and mouse use time, apps used how long (which) aps are open, etc. The detected attributes, in accordance with embodiments of the present systems and methods, include voice and face (during meeting(s)) in real time collected data. All of the detected attributes may be processed as workflow 210 and maintained in cloud storage 212. The collected data may, in accordance with embodiments of the present systems and methods, be aggregated, so as to protect privacy for team analytics. As noted above, one or more machine learning algorithms, or the like detects and evaluates and/or classifies user fatigue levels, based, at least in part, on the detected attributes. These machine learning algorithms may include face recognition application program interface 214, text analytics application program interface 216, a language understanding service 218, and/or the like.

Artificial intelligence algorithms, or the like, such as face service 220, cognitive service 222, or the like, may create inference models, based at least in part on the detected, evaluated and/or classified user fatigue levels from face recognition application program interface 214, text analytics application program interface 216, a language understanding service 218, and/or the like. For example, as discussed above, the face recognition application program interface, or the like, may provide detected, evaluated and/or classified user fatigue levels to the artificial intelligence face service, or the like. Also, the text analytics application program interface, language understanding service, and/or the like, may provide detected, evaluated and/or classified user fatigue levels to the artificial intelligence cognitive service, and/or the like. As noted in FIG. 2, artificial intelligence face service 220, may create an emotion inference model, and artificial intelligence cognitive service 222 may create a sentiment inference model.

Machine learning predictive services algorithm 224 uses the inference models created by artificial intelligence algorithms 220 and 222 to predict user effectiveness (i.e., performance) at different intervals, including, as discussed in greater detail above, predicting visual fatigue, emotional fatigue, and/or the like, in the user and/or team.

Machine learning predictive services algorithm 224 provides effectiveness weights for requested collaboration sessions that include the user, for wide team optimizations, for example to calendaring application program 226, collaboration application program 228, or the like. For example, in various embodiments the effectiveness weights may be provided as a recommendation value during collaboration configuring, such as when an organizer is setting up a (video) meeting, or the like, in the calendaring application program, in a meeting setup screen of the collaboration application program, and/or the like. This recommendation value may be presented by the calendaring application program, in a meeting setup screen of the collaboration application program, and/or the like, as an indication of the recommendation value for the collaboration session being organized, or for a meeting that has been organized and is pending. This recommendation value may be presented in the calendaring application program, in a meeting setup screen of the collaboration application program, and/or the like as a heat map dial 230 indicating the effectiveness weights, as a RYG indicator, and/or the like, corresponding to the effectiveness weights.

Additionally, as noted, in some embodiments of the present systems and methods, bot 232, or the like, may suggest an optimum time for the requested collaboration session, based, at least in part, on recommendation values associated with different times. To such ends calendaring application program 226 may, in accordance with such embodiments of the present systems and methods, present an option, to the collaboration organizer, for the bot to determine such optimum time for the requested collaboration session.

Further, in some embodiments of the present systems and methods, multiple workflows into a logic application program 234, or the like, may monitor for changes in the recommendation value provided by machine learning predictive services algorithm 224, for scheduled collaboration sessions and report any (significant) change in the recommendation value for the collaboration session to a collaboration session organizer, collaboration session participants, or the like, such as via email or other notification, such as by sending a calendaring application program notification.

Figure 3:
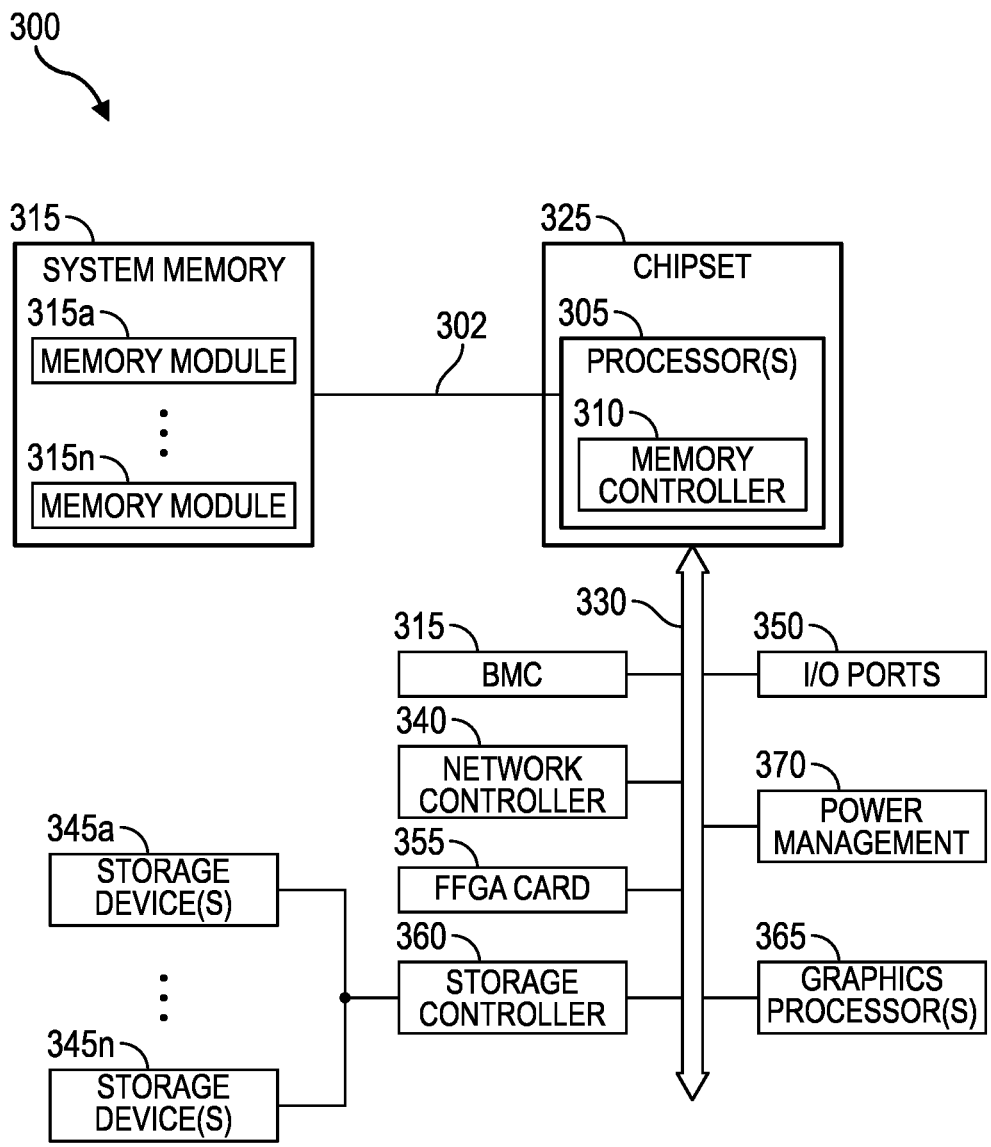
FIG. 3 is a block diagram depicting certain components of an Information Handling System (IHS) operable according to various embodiments to implement certain aspects of detection, aggregation, and distribution of user and/or team effectiveness utilizing fatigue detection from online collaboration.

FIG. 3 is a block diagram depicting certain components of an IHS operable according to various embodiments to implement certain aspects of detection, aggregation, and distribution of user and/or team effectiveness utilizing fatigue detection from online collaboration. As described in detail above, IHS 300 may include capabilities for utilizing fatigue detection from online collaboration, for detection, aggregation, and distribution of user and/or team effectiveness, in accordance with embodiments of the present systems and methods, for example, machine learning, artificial intelligence, cloud computing services, or the like. It should be appreciated that although IHS embodiment 300 described herein may be discussed in the context of a server, or the like, other embodiments may be utilized.

IHS 300 may utilize one or more processors 305. In some embodiments, processors 305 may include a main processor and a co-processor, each of which may include a plurality of processing cores that, in certain scenarios, may each be used to run an instance of a server process. In certain embodiments, one or all of processor(s) 305 may be graphics processing units (GPUs) in scenarios where IHS 300 has been configured to support functions such as multimedia services and graphics applications.

As illustrated, processor(s) 305 includes an integrated memory controller 310 that may be implemented directly within the circuitry of the processor 305, or the memory controller 310 may be a separate integrated circuit that is located on the same die as the processor 305. The memory controller 310 may be configured to manage the transfer of data to and from the system memory 315 of the IHS 305 via a high-speed memory interface 320. The system memory 315 is coupled to processor(s) 305 via a memory bus 320 that provides the processor(s) 305 with high-speed memory used in the execution of computer program instructions by the processor(s) 305. Accordingly, system memory 315 may include memory components, such as static RAM (SRAM), dynamic RAM (DRAM), NAND Flash memory, suitable for supporting high-speed memory operations by the processor(s) 305. In certain embodiments, system memory 315 may combine both persistent, non-volatile memory and volatile memory.

In certain embodiments, the system memory 315 may be comprised of multiple removable memory modules. The system memory 315 of the illustrated embodiment includes removable memory modules 315*a-n*. Each of the removable memory modules 315*a-n* may correspond to a printed circuit board memory socket that receives a removable memory module 315*a-n*, such as a DIMM (Dual In-line Memory Module), that can be coupled to the socket and then decoupled from the socket as needed, such as to upgrade memory capabilities or to replace faulty memory modules. Other embodiments of IHS memory 315 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 300 may utilize chipset 325 that may be implemented by integrated circuits that are coupled to processor(s) 305. In this embodiment, processor(s) 305 is depicted as a component of chipset 325. In other embodiments, all of chipset 325, or portions of chipset 325 may be implemented directly within the integrated circuitry of processor(s) 305. The chipset may provide the processor(s) 305 with access to a variety of resources accessible via one or more buses 330. Various embodiments may utilize any number of buses to provide the illustrated pathways served by bus 330. In certain embodiments, bus 330 may include a PCIe switch fabric that is accessed via a PCIe root complex.

As illustrated, IHS 300 includes BMC 335 to provide capabilities for remote monitoring and management of various aspects of IHS 300. In support of these operations, BMC 335 may utilize in-band, sideband and/or out of band communications with certain managed components of IHS 300, such as, for example, processor(s) 305, system memory 315, chipset 325, network controller 340, storage device(s) 345, etc. BMC 335 may be installed on the motherboard of IHS 300 or may be coupled to IHS 300 via an expansion slot provided by the motherboard. As a non-limiting example of a BMC, the integrated Dell Remote Access Controller (iDRAC) from Dell® is embedded within Dell Power-Edge™ servers and provides functionality that helps information technology (IT) administrators deploy, update, monitor, and maintain servers remotely. BMC 335 may include non-volatile memory having program instructions stored thereon that are usable by CPU(s) 305 to enable remote management of IHS 300. For example, BMC 335 may enable a user to discover, configure, and manage BMC 335, setup configuration options, resolve and administer hardware or software problems, etc. Additionally, or alternatively, BMC 335 may include one or more firmware volumes, each volume having one or more firmware files used by the BIOS' firmware interface to initialize and test components of IHS 300.

IHS 300 may also include the one or more I/O ports 350, such as USB ports, PCIe ports, TPM (Trusted Platform Module) connection ports, HDMI ports, audio ports, docking ports, network ports, Fibre Channel ports and other storage device ports. Such I/O ports 350 may be externally accessible or may be internal ports that are accessed by opening the enclosure housing IHS 300. Through couplings made to these I/O ports 350, users may couple the IHS 300 directly to other IHSs, storage resources, external networks and a vast variety of peripheral components.

As illustrated, IHS 300 may include one or more FPGA (Field-Programmable Gate Array) cards 355. Each of the FPGA card 355 supported by IHS 300 may include various processing and memory resources, in addition to an FPGA logic unit that may include circuits that can be reconfigured after deployment of IHS 300 through programming functions supported by the FPGA card 355. Through such reprogramming of such logic units, each individual FGPA card 355 may be optimized to perform specific processing tasks, such as specific signal processing, security, data mining, and artificial intelligence functions, and/or to support specific hardware coupled to IHS 300. In some embodiments, a single FPGA card 355 may include multiple FPGA logic units, each of which may be separately programmed to implement different computing operations, such as in computing different operations that are being offloaded from processor 305.

IHS 300 may include one or more storage controllers 360 that may be utilized to access storage devices 345*a-n* that are accessible via the chassis in which IHS 300 is installed. Storage controller 360 may provide support for RAID (Redundant Array of Independent Disks) configurations of logical and physical storage devices 345*a-n*. In some embodiments, storage controller 360 may be an HBA (Host Bus Adapter) that provides more limited capabilities in accessing physical storage devices 345*a-n*. In some embodiments, storage devices 345*a-n* may be replaceable, hot-swappable storage devices that are installed within bays provided by the chassis in which IHS 300 is installed. In embodiments where storage devices 345*a-n* are hot-swappable devices that are received by bays of chassis, the storage devices 345*a-n* may be coupled to IHS 300 via couplings between the bays of the chassis and a midplane of IHS 300. In some embodiments, storage devices 345*a-n* may also be accessed by other IHSs that are also installed within the same chassis as IHS 300. Storage devices 345*a-n* may include SAS (Serial Attached SCSI) magnetic disk drives, SATA (Serial Advanced Technology Attachment) magnetic disk drives, solid-state drives (SSDs) and other types of storage devices in various combinations.

Processor(s) 305 may also be coupled to a network controller 340 via bus 330, such as provided by a Network Interface Controller (NIC) that allows the IHS 300 to communicate via an external network, such as the Internet or a LAN. In some embodiments, network controller 340 may be a replaceable expansion card or adapter that is coupled to a motherboard connector of IHS 300. In some embodiments, network controller 340 may be an integrated component of IHS 300.

In certain embodiments, IHS 300 may operate using a BIOS (Basic Input/Output System) that may be stored in a non-volatile memory accessible by the processor(s) 305. The BIOS may provide an abstraction layer by which the operating system of the IHS 300 interfaces with the hardware components of the IHS. Upon powering or restarting IHS 300, processor(s) 305 may utilize BIOS instructions to initialize and test hardware components coupled to the IHS, including both components permanently installed as components of the motherboard of IHS 300, and removable components installed within various expansion slots supported by the IHS 300. The BIOS instructions may also load an operating system for use by the IHS 300. In certain embodiments, IHS 300 may utilize Unified Extensible Firmware Interface (UEFI) in addition to or instead of a BIOS. In certain embodiments, the functions provided by a BIOS may be implemented, in full or in part, by a remote access controller. In some embodiments, BIOS may be configured to identify hardware components that are detected as being currently installed in IHS 300. In such instances, the BIOS may support queries that provide the described unique identifiers that have been associated with each of these detected hardware components by their respective manufacturers. In providing an abstraction layer by which hardware of IHS 300 is accessed by an operating system, BIOS may identify the I/O ports 350 that are recognized and available for use. As described in additional detail below, embodiments may utilize an inventory certificate that is stored to the IHS during factory provisioning and that specifies the factory-provisioned I/O ports 350 of IHS 300. Embodiments may utilize such an inventory certificate during a pre-boot initialization of IHS 300 in order to enable, such as through BIOS configurations, only these factory-provisioned I/O ports 350 of IHS 300.

In some embodiments, IHS 300 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 300. These calculated hash values may then be compared against reference hash values that were previously stored in a secure non-volatile memory of the IHS, such as during factory provisioning of IHS 300. In this manner, a TPM may establish a root of trust that includes core components of IHS 300 that are validated as operating using instructions that originate from a trusted source.

In certain embodiments, a graphics processor 365 may be comprised within one or more video or graphics cards, or an embedded controller, installed as components of the IHS 300. A variety of additional components may be coupled to processor(s) 305 via bus 330. For instance, processor(s) 305 may also be coupled to a power management unit 370 that may interface with a Power Supply Unit (PSU) of IHS 300.

In various embodiments, an IHS 300 does not include each of the components shown in FIG. 1. In various embodiments, an IHS 300 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 305 as a systems-on-a-chip (SoC).

Figure 4:
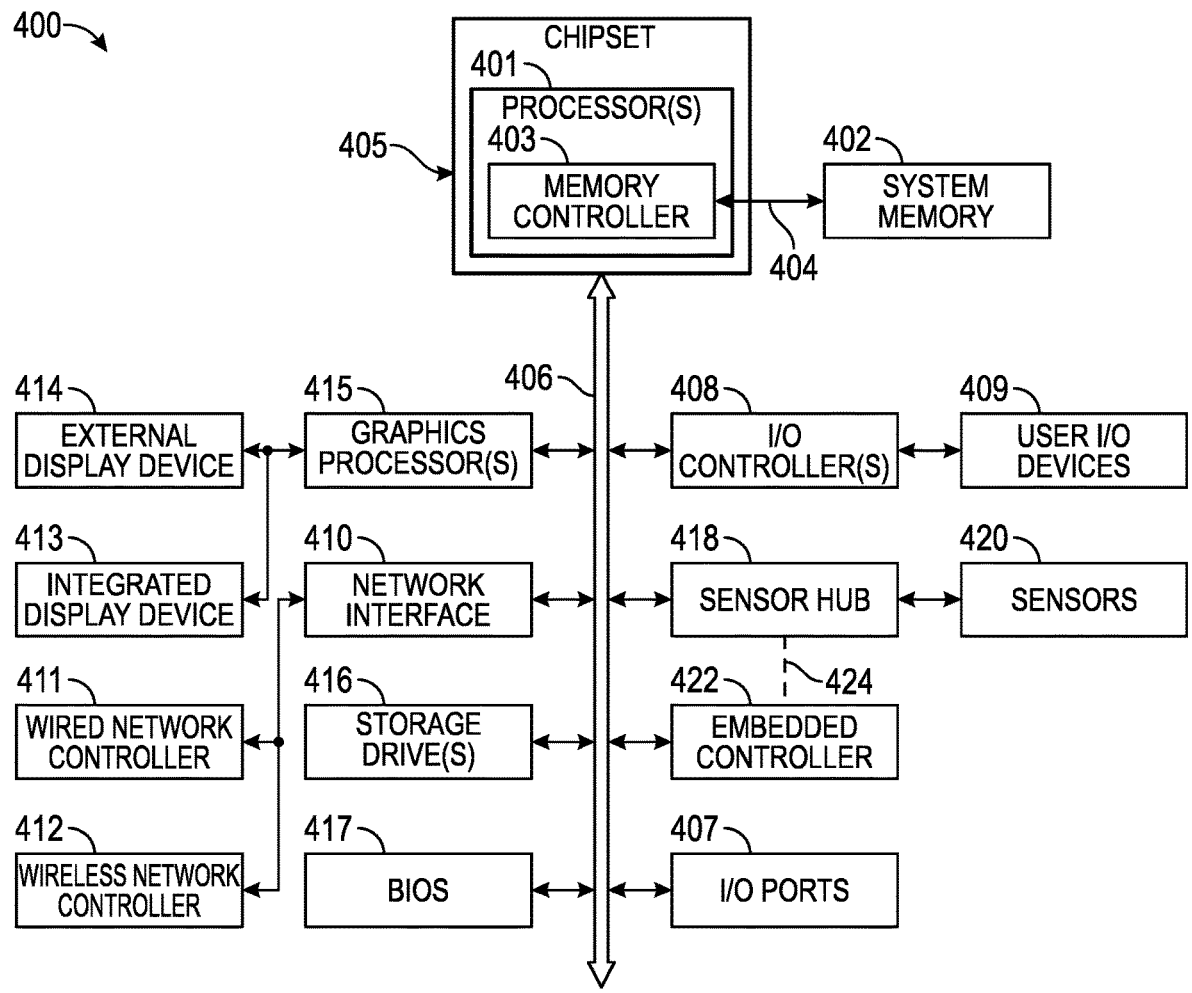
FIG. 4 is a block diagram depicting certain components of another IHS operable according to various embodiments to implement certain (other) aspects of detection, aggregation, and distribution of user and/or team effectiveness utilizing fatigue detection from online collaboration.

FIG. 4 is a block diagram depicting certain components of another IHS 400 operable according to various embodiments to implement certain (other) aspects of detection, aggregation, and distribution of user and/or team effectiveness utilizing fatigue detection from online collaboration. It should be appreciated that although IHS embodiment 400 described herein may be discussed in the context of a personal computing device, other embodiments may be utilized. As described in detail above, IHS 300 may include capabilities for utilizing fatigue detection from online collaboration, for detection, aggregation, and distribution of user and/or team effectiveness, in accordance with embodiments of the present systems and methods. F for example, IHS 400 may function as IHS 204, from which telemetry 202, real time use of IHS 204, data (e.g., meeting density) from calendaring application program 206, collaborative (video) meeting services reporting data 208, and/or the like, are gathered. Additionally, or alternatively, IHS 400 may host calendaring application program 226, collaboration application program 228, or the like, used to implement various aspects of the present systems and methods such as organizing collaborations and displaying recommendation value presented to the meeting organizer, such as a heat map dial, RYG indicators, or the like, corresponding to collaboration effectiveness weights.

As shown, IHS 400 includes one or more processors 401, such as a Central Processing Unit (CPU), that execute code retrieved from system memory 402. Although IHS 400 is illustrated with a single processor 401, other embodiments may include two or more processors, that may each be configured identically, or to provide specialized processing operations. Processor(s) 401 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 4, processor(s) 401 includes memory controller 403 that may be implemented directly within the circuitry of processor(s) 401, or memory controller 403 may be a separate integrated circuit that is located on the same die as processor(s) 401. Memory controller 403 may be configured to manage the transfer of data to and from the system memory 402 of IHS 400 via high-speed memory interface 404. System memory 402 coupled to processor(s) 401 provides processor(s) 401 with a high-speed memory that may be used in the execution of computer program instructions by processor(s) 401. Accordingly, system memory 402 may include memory components, such as static RAM (SRAM), dynamic RAM (DRAM), NAND Flash memory, suitable for supporting high-speed memory operations by processor(s) 401. In certain embodiments, system memory 402 may combine both persistent, non-volatile memory and volatile memory. In certain embodiments, system memory 402 may include multiple removable memory modules.

IHS 400 utilizes chipset 405 that may include one or more integrated circuits that are connected to processor(s) 401. In the embodiment of FIG. 1, processor(s) 401 is depicted as a component of chipset 405. In other embodiments, all of chipset 405, or portions of chipset 405 may be implemented directly within the integrated circuitry of processor(s) 401. Chipset 405 provides processor(s) 401 with access to a variety of resources accessible via bus 406. In IHS 400, bus 406 is illustrated as a single element. Various embodiments may utilize any number of separate buses to provide the illustrated pathways served by bus 406.

In various embodiments, IHS 400 may include one or more I/O ports 407 that may support removeable couplings with various types of external devices and systems, including removeable couplings with peripheral devices that may be configured for operation by a particular user of IHS 400. For instance, I/O ports 407 may include USB (Universal Serial Bus) ports, by which a variety of external devices may be coupled to IHS 400. In addition to or instead of USB ports, I/O ports 407 may include various types of physical I/O ports that are accessible to a user via the enclosure of IHS 400.

In certain embodiments, chipset 405 may additionally utilize one or more I/O controllers 408 that may each support the operation of hardware components such as user I/O devices 409 that may include peripheral components physically coupled to I/O port 407 and/or peripheral components that are wirelessly coupled to IHS 400 via network interface 410. In various implementations, I/O controller 408 may support the operation of one or more user I/O devices 408 such as a keyboard, mouse, touchpad, touchscreen, microphone, speakers, camera and other input and output devices that may be coupled to IHS 400. User I/O devices 409 may interface with an I/O controller 408 through wired or wireless couplings supported by IHS 400. In some cases, I/O controllers 408 may support configurable operation of supported peripheral devices, such as user I/O devices 409.

As illustrated, a variety of additional resources may be coupled to processor(s) 401 of IHS 400 through chipset 405. For instance, chipset 405 may be coupled to network interface 410 that may support different types of network connectivity. IHS 400 may also include one or more Network Interface Controllers (NICs) 411 and 412, each of which may implement the hardware required for communicating via a specific networking technology, such as BLUETOOTH, Wi-Fi, Ethernet and mobile cellular networks (e.g., CDMA, TDMA, LTE). Network interface 410 may support network connections by wired network controllers 411 and wireless network controllers 412. Each network controller 411 and 412 may be coupled via various buses to chipset 405 to support different types of network connectivity, such as the network connectivity utilized by IHS 400.

As illustrated, IHS 400 may support integrated display device 413, such as a display integrated into a laptop, tablet, 2-in-1 convertible device, or mobile device. IHS 400 may also support use of one or more external displays 414, such as external monitors that may be coupled to IHS 400 via various types of couplings, such as by connecting a cable from the external display 414 to external I/O port 407 of the IHS 400. One or more display devices 413 and/or 414 coupled to IHS 400 may utilize LCD, LED, OLED, or other display technologies. Each display device 413 and 414 may be capable of receiving touch inputs such as via a touch controller that may be an embedded component of display device 413 and/or 414 or graphics processor 415, or it may be a separate component of IHS 400 accessed via bus 406. In some cases, power to graphics processor 415, integrated display device 413 and/or external display 414 may be turned off or configured to operate at minimal power levels in response to IHS 400 entering a low-power state (e.g., standby). In certain scenarios, the operation of integrated displays 413 and external displays 414 may be configured for a particular user. For instance, a particular user may prefer specific brightness settings that may vary the display brightness based on time of day and ambient lighting conditions. As such, chipset 405 may provide access to one or more display device(s) 413 and/or 414 via graphics processor 415. Graphics processor 415 may be included within a video card, graphics card or within an embedded controller installed within IHS 400. Additionally, or alternatively, graphics processor 415 may be integrated within processor(s) 401, such as a component of a system-on-chip (SoC). Graphics processor 415 may generate display information and provide the generated information to one or more display device(s) 413 and/or 414, coupled to IHS 400.

Chipset 405 also provides processor(s) 401 with access to one or more storage devices 416. In various embodiments, storage device 416 may be integral to IHS 400 or may be external to IHS 400. In certain embodiments, storage device 416 may be accessed via a storage controller that may be an integrated component of the storage device. Storage device 416 may be implemented using any memory technology allowing IHS 400 to store and retrieve data. For instance, storage device 416 may be a magnetic hard disk storage drive or a solid-state storage drive. In certain embodiments, storage device 416 may be a system of storage devices, such as a cloud system or enterprise data management system that is accessible via network interface 140.

As illustrated, IHS 400 also includes Basic Input/Output System (BIOS) 417 that may be stored in a non-volatile memory accessible by chipset 405 via bus 406. Upon powering or restarting IHS 400, processor(s) 401 may utilize BIOS 417 instructions to initialize and test hardware components coupled to the IHS 400. BIOS 417 instructions may also load an OS (e.g., WINDOWS, MACOS, iOS, ANDROID, LINUX, etc.) for use by IHS 400. BIOS 417 provides an abstraction layer that allows the operating system to interface with the hardware components of the IHS 400. The Unified Extensible Firmware Interface (UEFI) was designed as a successor to BIOS. As a result, many IHSs utilize UEFI in addition to or instead of a BIOS. As used herein, BIOS is intended to also encompass UEFI.

As illustrated, certain IHS 400 embodiments may utilize sensor hub 418 capable of sampling and/or collecting data from a variety of hardware sensors 120. Sensors may provide access to data describing environmental and operating conditions of IHS 400 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 401 may receive and/or produce context information using sensors 120 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 400, a physical keyboard external to IHS 400, or an on-screen keyboard), whether the user operating the keyboard is typing with one or two hands (e.g., holding a stylus, or the like), a time of day, software application(s) under execution in focus for receiving keyboard input, whether IHS 400 is inside or outside of a carrying bag, ambient lighting, a battery charge level, whether IHS 400 is operating from battery power or is plugged into an AC power source (e.g., whether the IHS is operating in AC-only mode, DC-only mode, or AC+DC mode), a power consumption of various components of IHS 400 (e.g., CPU 401, GPU 415, system memory 402, etc.), an operating temperature of components of IHS 400, such as CPU temperature, memory module temperature, etc. In certain embodiments, sensor hub 418 may be an independent microcontroller or other logic unit that is coupled to the motherboard of IHS 400. Sensor hub 418 may be a component of an integrated system-on-chip incorporated into processor 401, and it may communicate with chipset 405 via a bus connection such as an Inter-Integrated Circuit (I2C) bus or other suitable type of bus connection. Sensor hub 418 may also utilize an I2C bus for communicating with various sensors supported by IHS 400.

As illustrated, IHS 400 may utilize embedded controller (EC) 122, which may be a motherboard component of IHS 400 and may include one or more logic units. In certain embodiments, EC 122 may operate from a separate power plane from the main processors 401 and thus the OS operations of IHS 400. Firmware instructions utilized by EC 122 may be used to operate a secure execution system that may include operations for providing various core functions of IHS 400, such as power management, management of operating modes in which IHS 400 may be physically configured and support for certain integrated I/O functions. In some embodiments, EC 122 and sensor hub 418 may communicate via an out-of-band signaling pathway or bus 124.

In various embodiments, IHS 400 may not include each of the components shown in FIG. 1. Additionally, or alternatively, IHS 400 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 401 as an SoC.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices."

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method to detect, aggregate, and distribute user and team effectiveness, comprising:
   detecting, using one or more machine learning algorithms, fatigue levels of a user that is a member of a team, based, at least in part, on detected attributes comprising one or more of information handling system use telemetry, real time information handling system use, data from a calendaring application program and collaborative meeting services reporting data collected by a collaborative meeting services vendor;
   evaluating and/or classifying, using one or more second machine learning algorithms, the fatigue levels of the user, based, at least in part, on the detected attributes;
   implementing, using a plurality of artificial intelligence algorithms, a facial recognition inference model, based at least in part on resultingly detected and evaluated and/or classified visual fatigue levels of the user;
   generating a plurality of effectiveness weights for performance of the user at different intervals and for performance of each member of the team at the different intervals, wherein the plurality of effectiveness weights are generated based on a combination of the facial recognition inference model, historical data for the user and for each member of the team, and user-specific collaboration factors; and
   providing, by a machine learning predictive services algorithm, effectiveness weights for each of two or more requested collaboration sessions that include the user and other members of the team, wherein the effectiveness weights for each of the two or more requested collaboration sessions are calculated based on a combination of user-specific factors, historical performance data, and real-time collaboration metrics.

2. The method of claim 1, wherein providing the effectiveness weights for each of the two or more requested collaboration sessions that include the user further comprises providing a recommendation value during collaboration configuring.

3. The method of claim 2, wherein, in providing the recommendation value during the collaboration configuring, the recommendation value is a heat map dial indicating the effectiveness weights for each of the two or more requested collaboration sessions.

4. The method of claim 2, wherein, in providing the recommendation value during the collaboration configuring, the recommendation value is a red, yellow, green indicator corresponding to the effectiveness weights for each of the two or more requested collaboration sessions.

5. The method of claim 2 wherein, in providing the recommendation value during the collaboration configuring, the collaboration configuring is carried out on the calendaring application program and the recommendation value is provided to the calendaring application program and presented by the calendaring application program as an indication of the recommendation value for a collaboration session.

6. The method of claim 2, further comprising suggesting, by a bot, an optimum time for a collaboration session, based, at least in part, on recommendation values associated with different times.

7. The method of claim 6, wherein the collaboration configuring is carried out on the calendaring application program and the method further comprises presenting, by the calendaring application program an option, to a collaboration organizer, for the bot to determine the optimum time for the requested collaboration session.

8. The method of claim 2, further comprising monitoring, by a logic application program, changes in the recommendation value, following scheduling of a collaboration session, and reporting a change in the recommendation value for the collaboration session to a collaboration session organizer.

9. The method of claim 1, wherein, in implementing, using the plurality of artificial intelligence algorithms, the facial recognition inference model, based at least in part on the resultingly detected and evaluated and/or classified visual fatigue levels of the user, the plurality of artificial intelligence algorithms comprise a cognitive service.

10. The method of claim 1, wherein, in evaluating and/or classifying, using the one or more second machine learning algorithms, the fatigue levels of the user, based, at least in part, on the detected attributes, the one or more second machine learning algorithms comprise a face recognition application program interface, a text analytics application program interface and/or a language understanding service.

11. The method of claim 10, wherein, in evaluating and/or classifying, using the one or more second machine learning algorithms, the fatigue levels of the user, based, at least in part, on the detected attributes, the face recognition application program interface provides, in the resultingly detected and evaluated and/or classified visual fatigue levels of the user to an artificial intelligence face service and the text analytics application program interface and/or the language understanding service provides the resultingly detected and evaluated and/or classified visual fatigue levels of the user to an artificial intelligence cognitive service.

12. The method of claim 11, wherein, in evaluating and/or classifying, using the one or more second machine learning algorithms, the fatigue levels of the user, based, at least in part, on the detected attributes, the artificial intelligence face service uses an emotion inference model, based at least in part on the resultingly detected and evaluated and/or classified visual fatigue levels of the user, and the artificial intelligence cognitive service uses a sentiment inference model, based at least in part on the resultingly detected and evaluated and/or classified visual fatigue levels of the user.

13. A non-transitory computer readable medium having program instructions stored thereon that, upon execution by an information handling system, cause the information handling system to:
   detect, using one or more machine learning algorithms, fatigue levels of a user that is a member of a team, based, at least in part, on detected attributes comprising one or more of information handling system use telemetry, real time information handling system use, data from a calendaring application program and collaborative meeting services reporting data collected by a collaborative meeting services vendor;

evaluate and/or classify, using one or more second machine learning algorithms, fatigue levels of the user, based, at least in part, on detected attributes;

implement, using a plurality of artificial intelligence algorithms, a facial recognition inference model, based at least in part on resultingly detected and evaluated and/or classified visual fatigue levels of the user;

generate a plurality of effectiveness weights for user performance at different intervals and for performance of each member of the team at the different intervals, wherein the plurality of effectiveness weights are generated based on a combination of the facial recognition inference model, historical data for the user and for each member of the team, and user-specific collaboration factors; and provide, by a machine learning predictive services algorithm, effectiveness weights for each of two or more requested collaboration sessions that include the user and other members of the team, wherein the effectiveness weights for each of the two or more requested collaboration sessions are calculated based on a combination of user-specific factors, historical performance data, and real-time collaboration metrics.

14. The non-transitory computer readable medium of claim 13, wherein upon execution by the information handling system, further cause the information handling system to provide the effectiveness weights for each of the two or more requested collaboration sessions that include the user further comprises providing a recommendation value during collaboration configuring.

15. The non-transitory computer readable medium of claim 13, wherein upon execution by the information handling system, further cause the information handling system to suggest, by a bot, an optimum time for a requested collaboration session, based, at least in part, on effectiveness weights associated with different times.

16. The non-transitory computer readable medium of claim 13, wherein upon execution by the information handling system, further cause the information handling system to monitor, by a logic application program, changes in the effectiveness weights for each of the two or more requested collaboration sessions, following scheduling of a collaboration session, and reporting a change in an effectiveness weights value for the collaboration session to a collaboration session organizer.

17. An information handling system, comprising:
a processor; and
a memory coupled to the processor, the memory having program instructions stored thereon that, upon execution by the processor, cause the information handling system to:

detect, using one or more machine learning algorithms, fatigue levels of a user that is a member of a team, based, at least in part, on detected attributes comprising one or more of information handling system use telemetry, real time information handling system use, data from a calendaring application program and collaborative meeting services reporting data collected by a collaborative meeting services vendor;

evaluate and/or classify, using one or more second machine learning algorithms, fatigue levels of the user, based, at least in part, on detected attributes;

implement, using a plurality of artificial intelligence algorithms, a facial recognition inference model, based at least in part on resultingly detected and evaluated and/or classified visual fatigue levels of the user;

generate a plurality of effectiveness weights for user performance at different intervals and for performance of each member of the team at different intervals, wherein the plurality of effectiveness weights are generated based on a combination of the facial recognition inference model, historical data for the user and for each member of the team, and user-specific collaboration factors; and provide, by a machine learning predictive services algorithm, effectiveness weights for each of two or more requested collaboration sessions that include the user and other members of the team, wherein the effectiveness weights for each of the two or more requested collaboration sessions are calculated based on a combination of user-specific factors, historical performance data, and real-time collaboration metrics.

* * * * *